Sept. 19, 1950          L. R. SMITH          2,522,906
CHRISTMAS TREE VIBRATOR
Filed April 3, 1947
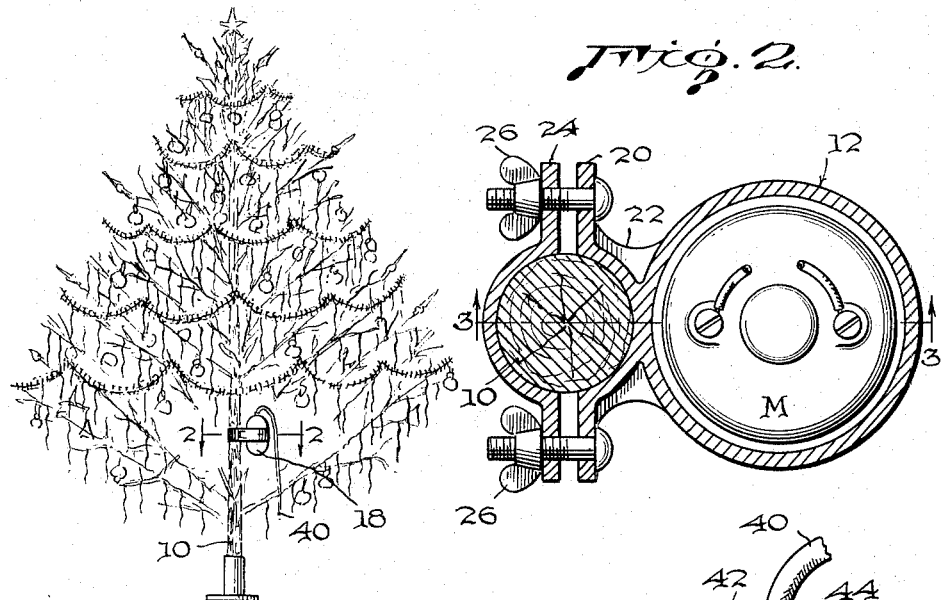
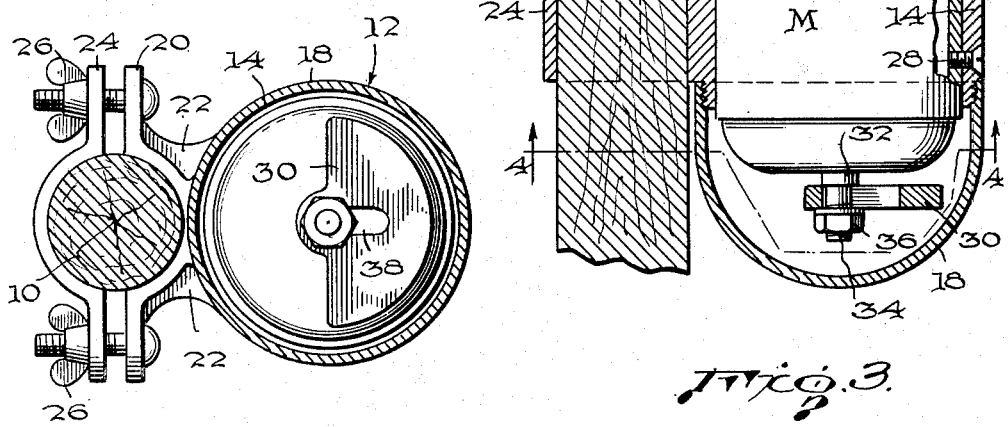
Inventor
LEO R. SMITH
By Raymond N. Matson
Attorney Patented Sept. 19, 1950

2,522,906

UNITED STATES PATENT OFFICE 2,522,906

CHRISTMAS TREE VIBRATOR

Leo R. Smith, Alexandria, Va.

Application April 3, 1947, Serial No. 739,238

1 Claim. (Cl. 259—1)

This invention relates generally to decorative effects and more particularly to a novel method of and apparatus for enhancing the appearance of a decorated article such as a Christmas tree.

The decorative effect of evergreen trees at Christmas time has been enhanced in the past by various means such as the use of a great number of different types of ornaments, tinsel, etc. In an effort to further enhance the appearance of such decorated trees, a number of devices such as rotatable supports have been provided therefor. Such supports introduce electrical connection problems, are expensive and cumbersome and fail largely in their intended purpose.

Accordingly, the chief object of the present invention is to eliminate the difficulties entailed in the use of such prior art devices by providing an apparatus which materially enhances the appearance of a decorated tree.

Another important object of the invention is to provide a vibratory unit for attachment to decorated trees which will transmit a highly pleasing two-dimensional vibration thereto without interference with the decorations.

A further important object of the invention is to provide a portable vibrating unit which can be readily attached to any size tree and includes means for adjusting the intensity of the vibrations in accordance with the size of such trees.

A still further important object of the invention is to provide a method of and apparatus for effecting a slight two-dimensional vibration of a tree and its decorations to enhance the appearance thereof and to obtain a pleasing sound from the decorations so vibrated.

Another object of the invention is to provide an apparatus of the type described which will be quiet in operation, low in cost, and of long life.

Other objects and advantages of the invention will become apparent during the course of the following description.

In the drawings I have shown one embodiment of the invention. In this showing:

Figure 1 is a view showing the invention operatively attached to a decorated tree;

Figure 2 is a horizontal sectional view to an enlarged scale, taken on line 2—2 of Figure 1;

Figure 3 is a central vertical longitudinal sectional view taken on the line 3—3 of Figure 2; and Figure 4 is a horizontal sectional view taken on the line 4—4 of Figure 3, parts being shown in elevation.

Referring to the drawings, numeral 10 designates a tree usually of the evergreen type and provided at Christmas time with various types of ornaments, tinsel, paint, etc., to enhance its appearance. To further enhance its pleasing effect upon the eye and to impart a pleasant rustling sound to the ear, a two-dimensional vibrating unit 12 is provided for ready attachment to the decorated tree adjacent its base.

The unit 12 comprises a central casing member 14 and a pair of end closure members 16 and 18 adapted to have screw threaded engagement with the casing 14. The casing has a laterally projecting bracket 20 formed integrally therewith and the strengthening rib 22 of the bracket merges into the casing which is of greater thickness than the closures 16 and 18. A mating bracket 24 cooperates with the bracket 20 in encircling the trunk of the tree 10 to be clamped thereto by means of the elongated screws and wing nuts 26. The casing may thus be readily attached to trees of various diameters.

A self-starting motor M capable of relatively low operating speeds, preferably from 800 to 1400 R. P. M., is inserted within the casing 14 and secured therein by means of screws 28. An eccentric 30 is clamped against a shoulder 32 on the lower end of the motor shaft 34 by means of a nut 36. The position of the eccentric 30 is radially adjustable within a slot 38 with respect to the shaft 34 so as to vary the intensity of the vibrations transmitted thereby to the tree. The control of the frequency of the vibrations is completed by the use of a rheostat (not shown) for motor speed.

The unit 12 receives electric power by means of a conventional socket plug (not shown) having a cord 40 entering an aperture 42 in the upper end of the closure 16. The aperture is sealed by a suitable packing annulus 44. The casing, closures and brackets are preferably formed of a high strength but lightweight plastic, although it may also be made of metal, etc.

In use, the unit 12 is preferably attached to a tree adjacent its base and if placed above the lowermost branches, will be effectively hidden thereby. The motor M is then plugged into the house circuit and the resultant vibrations effected by the eccentric will cause the tree trunk to vibrate.

The optimum effect is obtained when the motion of the trunk is imperceptible and this condition may be readily obtained by adjusting the position of the eccentric with respect to the motor shaft or by adjusting the motor speed.

Inasmuch as the motor shaft 34 is parallel to the tree trunk, a two-dimensional vibratory movement rather than a mere oscillation is effected by the unit 12. This causes the evergreen needles and the conventional normally shining light-weight Christmas decorations, such as tinsel, spun-glass, tin-foil strips, mica particles, ornaments, etc., to move slightly in frequency with the vibrational movement of the unit 12. This resonant movement, though very slight, is sufficient to cause the normally shining light-weight ornaments to sparkle profusely.

In addition to the foregoing carefully regulated and highly pleasing effect, the vibrational movement of the various ornaments and evergreen needles produces an intriguing rustling sound of low magnitude similar to the sound of sleet falling upon packed snow. Due to the regulated nature of the two-dimensional vibration producing the pleasing effects described, the decorations are not dislodged nor is any failure of the tree lighting system caused.

It will now be readily apparent that the present invention produces highly pleasing and unusual decorative and auditory effects by means which are compact and inexpensive, silent, and entirely enclosed so as to be safe in operation.

It is to be understood that the form of my invention herewith shown and described is to be taken as a preferred example of the same and that various changes in the shape, size and arrangement of parts may be resorted to without departure from the spirit of the invention or the scope of the subjoined claim.

I claim:

The combination with a tree adapted to be equipped with decorations; of a vibrating unit mounted in cooperation therewith for imparting a substantially imperceptible vibratory movement to the trunk to enhance the appearance of the tree by effecting movement of the decorations.

LEO R. SMITH.

REFERENCES CITED

The following references are of record in the file of this patent:

UNITED STATES PATENTS

| Number | Name | Date |
| --- | --- | --- |
| 1,346,221 | Liedtke | July 13, 1920 |
| 1,354,319 | Lowe | Sept. 28, 1920 |
| 1,886,401 | Jackson | Nov. 8, 1932 |
| 1,947,941 | Jackson | Feb. 20, 1934 |
| 2,413,109 | Leipold et al. | Dec. 24, 1936 |